(12) United States Patent
Hayashi et al.

(10) Patent No.: US 11,468,767 B2
(45) Date of Patent: Oct. 11, 2022

(54) MAP INFORMATION SYSTEM

(71) Applicant: TOYOTA JIDOSHA KABUSHIKI KAISHA, Toyota (JP)

(72) Inventors: Yusuke Hayashi, Susono (JP); Keisuke Hokai, Susono (JP)

(73) Assignee: TOYOTA JIDOSHA KABUSHIKI KAISHA, Tokyo (JP)

(*) Notice: Subject to any disclaimer, the term of this patent is extended or adjusted under 35 U.S.C. 154(b) by 268 days.

(21) Appl. No.: 16/537,781

(22) Filed: Aug. 12, 2019

(65) Prior Publication Data
US 2020/0118424 A1 Apr. 16, 2020

(30) Foreign Application Priority Data
Oct. 10, 2018 (JP) .............................. JP2018-191636

(51) Int. Cl.
| G08G 1/00 | (2006.01) |
| G08G 1/01 | (2006.01) |
| G06F 16/44 | (2019.01) |
| G08G 1/0962 | (2006.01) |
| G08G 1/052 | (2006.01) |

(52) U.S. Cl.
CPC ......... G08G 1/0125 (2013.01); G06F 16/444 (2019.01); G08G 1/052 (2013.01); G08G 1/0962 (2013.01)

(58) Field of Classification Search
None
See application file for complete search history.

(56) References Cited

U.S. PATENT DOCUMENTS

2008/0243378 A1* 10/2008 Zavoli .................... G01C 21/28
701/533
2013/0223686 A1* 8/2013 Shimizu ................. G06V 20/58
382/103
(Continued)

FOREIGN PATENT DOCUMENTS

| JP | 2008-234044 A | 10/2008 |
| JP | 2010-160777 A | 7/2010 |
| JP | 2012-196999 A | 10/2012 |

(Continued)

*Primary Examiner* — Truc M Do
(74) *Attorney, Agent, or Firm* — Sughrue Mion, PLLC

(57) ABSTRACT

A map information system includes a database management device configured to manage a map database used for vehicle driving support control. The map database includes background map information that indicates a position of a stationary object and an evaluation value. The evaluation value indicates certainty that the stationary object exists at the position indicated by the background map information. Driving environment information includes: surrounding situation information including information on a detected target detected by an in-vehicle sensor; and vehicle state information indicating the vehicle state. The database management device recognizes relative behavior of the vehicle with respect to the detected target, based on the driving environment information. The database management device determines, based on the relative behavior, whether or not the detected target is the stationary object to set the evaluation value of the background map information regarding a detected position of the detected target.

3 Claims, 17 Drawing Sheets

(56) References Cited

U.S. PATENT DOCUMENTS

2014/0309841 A1 10/2014 Hara et al.
2019/0051153 A1* 2/2019 Giurgiu .............. G01C 21/3811

FOREIGN PATENT DOCUMENTS

| JP | 2013-109625 A | 6/2013 |
| JP | 2014-137743 A | 7/2014 |
| JP | 2017-004040 A | 1/2017 |
| WO | 2013/076829 A1 | 5/2013 |

* cited by examiner

MAP INFORMATION SYSTEM

BACKGROUND

Technical Field

The present disclosure relates to a technique that manages map information used for driving support control that supports driving of a vehicle.

Background Art

Patent Literature 1 discloses a traffic information providing system. The traffic information providing system includes an in-vehicle device having a navigation function and a traffic information center that provides a vehicle with traffic information (traffic jam information). The in-vehicle device determines whether or not there is a deviation between actual travel information of the vehicle and the traffic information provided from the traffic information center. When there is the deviation, the in-vehicle device sends deviation information to the traffic information center. The traffic information center updates the traffic information based on the deviation information.

LIST OF RELATED ART

Patent Literature 1: Japanese Unexamined Patent Application Publication No. 2013-109625

SUMMARY

Let us consider driving support control that supports driving of a vehicle. It is conceivable in the driving support control to use map information that indicates a position of a stationary object. In order to increase accuracy of the driving support control, it is necessary to increase accuracy of the map information. In order to obtain more accurate map information, it is desirable to more accurately determine presence of the stationary object.

An object of the present disclosure is to provide a technique that can increase accuracy of background map information that is used for driving support control and indicates a position of a stationary object.

In an aspect of the present disclosure, a map information system is provided.

The map information system includes a database management device configured to manage a map database used for driving support control that supports driving of a vehicle.

The map database includes background map information that indicates a position of a stationary object and an evaluation value.

The evaluation value indicates certainty that the stationary object exists at the position indicated by the background map information.

Driving environment information indicating driving environment for the vehicle includes:
  surrounding situation information including information on a detected target that is detected by a sensor installed on the vehicle; and
  vehicle state information indicating a state of the vehicle.
The database management device is further configured to:
  recognize relative behavior of the vehicle with respect to the detected target, based on the driving environment information; and
  determine, based on the relative behavior, whether or not the detected target is the stationary object to set the evaluation value of the background map information regarding a detected position of the detected target.

According to the present disclosure, the database management device recognizes the relative behavior of the vehicle with respect to the detected target, based on the driving environment information. Then, the database management device determines, based on the relative behavior, whether or not the detected target is the stationary object to set the evaluation value of the background map information regarding the detected position of the detected target. The relative behavior of the vehicle with respect to a "stationary object" is totally different from the relative behavior of the vehicle with respect to a "non-stationary object". Therefore, taking the relative behavior of the vehicle into consideration makes it possible to set the evaluation value with higher accuracy. As a result, accuracy (quality) of the background map information is increased.

EMBODIMENTS

Embodiments of the present disclosure will be described below with reference to the attached drawings.

1. Outline 1-1. Map Information System

Figure 1:
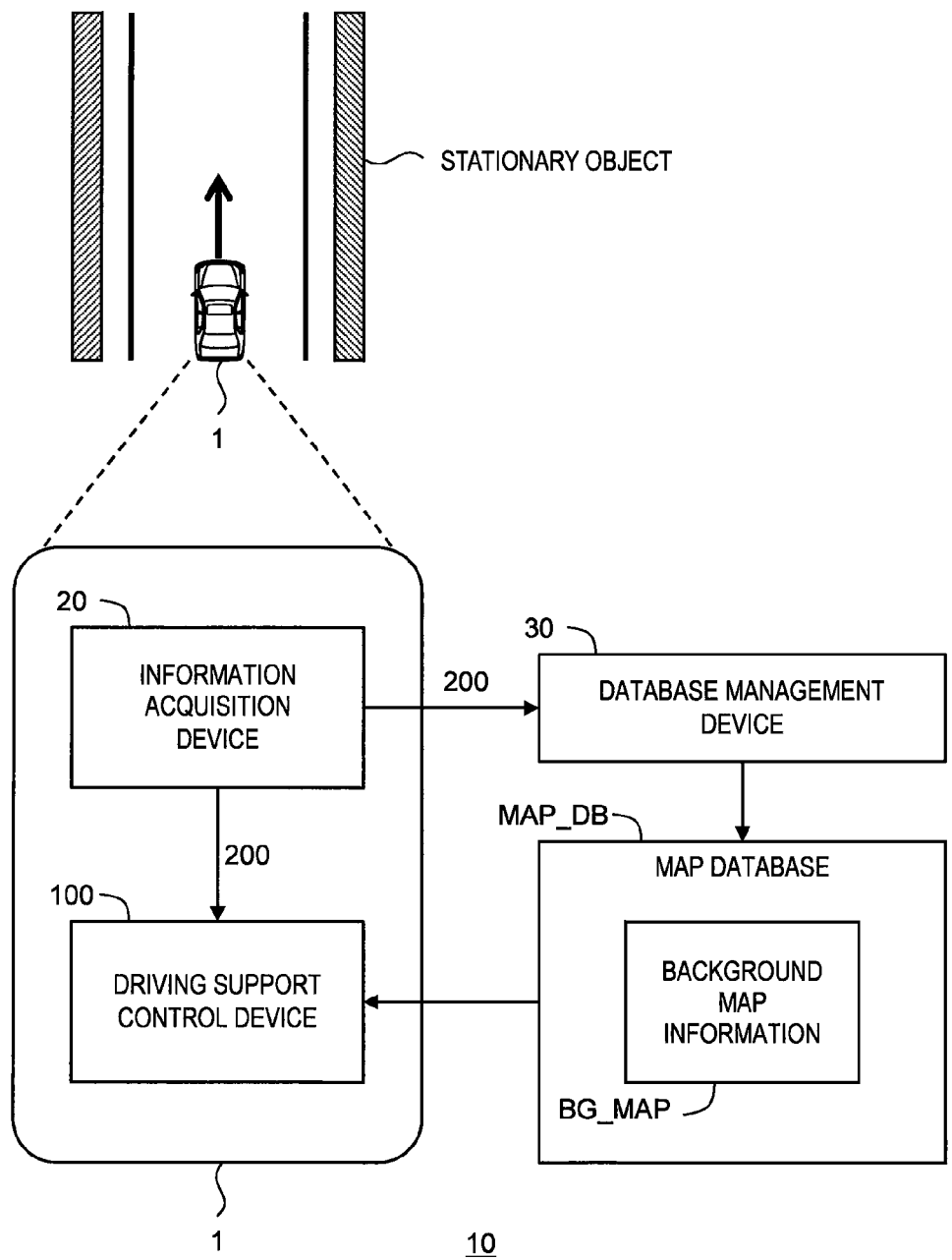
FIG. 1 is a conceptual diagram for explaining an outline of an embodiment of the present disclosure.

FIG. 1 is a conceptual diagram for explaining an outline of the present embodiment. A driving support control device 100 is installed on a vehicle 1. The driving support control device 100 executes driving support control that supports driving of the vehicle 1. Typically, the driving support control includes at least one of steering control, acceleration control, and deceleration control. Such the driving support control is exemplified by automated driving control (autonomous driving control), trajectory-following control (path-following control), lane keep assist control (lane tracing assist control), collision avoidance control, and so forth.

In the driving support control, map information is often used. The map information provides a variety of information associated with a position. Here, the position is an absolute position and is defined in an absolute coordinate system (e.g. latitude, longitude, and altitude). A map database MAP_DB is a set of a variety of map information. It should be noted that the map database MAP_DB may be stored in a memory device of the vehicle 1, or may be stored in an external device outside the vehicle 1.

A map information system 10 according to the present embodiment is a system that manages and utilizes the map database MAP_DB. More specifically, the map information system 10 includes the map database MAP_DB, an information acquisition device 20, and a database management device 30. The map information system 10 may further include the driving support control device 100 that utilizes the map database MAP_DB.

The information acquisition device 20 is installed on the vehicle 1. The information acquisition device 20 uses a sensor installed on the vehicle 1 to acquire a variety of information. Information acquired by the sensor installed on the vehicle 1 indicates driving environment for the vehicle, and such the information is hereinafter referred to as "driving environment information 200". For example, the driving environment information 200 includes vehicle position information indicating a position of the vehicle 1, vehicle state information indicating a state of the vehicle 1, surrounding situation information indicating a situation around the vehicle 1, and so forth. The driving environment information 200 is used for the driving support control by the driving support control device 100 along with the map database MAP_DB. Furthermore, the driving environment information 200 is also used for management of the map database MAP_DB.

The database management device 30 manages the map database MAP_DB used for the driving support control. The management of the map database MAP_DB includes at least one of generation and update of the map database MAP_DB. It should be noted that the database management device 30 may be installed on the vehicle 1, or may be included in an external device outside the vehicle 1. Alternatively, the database management device 30 may be distributed to the vehicle 1 and the external device.

1-2. Background Map Information

The map database MAP_DB according to the present embodiment includes "background map information BG_MAP". The background map information BG_MAP is the map information regarding a stationary object. The stationary object is a steady road-related structure such as a wall, a guardrail, and the like. It can be said that the stationary object is background.

More specifically, the background map information BG_MAP indicates a "position (absolute position)" of a stationary object and an "evaluation value" that are associated with each other. The evaluation value indicates "certainty" of the background map information BG_MAP. In other words, the evaluation value indicates "certainty" that the stationary object actually exists at the position indicated by the background map information BG_MAP. The certainty can be reworded as accuracy or reliability. The evaluation value can be reworded as a score.

Information that "there is a strong probability that a stationary object exists" is useful. For example, such the information is used for removing the stationary object from LIDAR point cloud to detect a non-stationary object such as a pedestrian. Information that "there is a strong probability that no stationary object exists" also is useful. The reason is that when a target is detected in free space where no stationary object exists, the detected target can be regarded as a non-stationary object. In this manner, the background map information BG_MAP can be utilized for recognizing a non-stationary object, for example. When the non-stationary object is recognized, it is possible to execute the driving support control for avoiding the non-stationary object.

Figure 2:
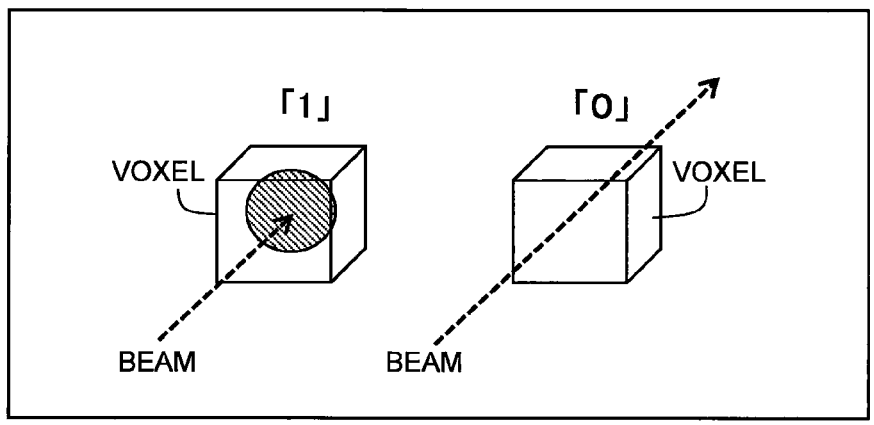
FIG. 2 is a conceptual diagram for explaining an example of background map information in the embodiment of the present disclosure.

FIG. 2 conceptually shows an example of the background map information BG_MAP. For example, space surrounding the vehicle 1 is divided into a large number of voxels VX. One data set is created for each voxel $VX_i$. Each data set includes a position $[X_i, Y_i, Z_i]$ of a voxel $VX_i$, an occupancy $R_i$, an evaluation value $P_i$, and evaluation information.

We first describe the occupancy $R_i$. As an example, let us consider a case where a LIDAR (Laser Imaging Detection and Ranging) installed on the vehicle 1 is used for detecting the stationary object. The LIDAR outputs laser beams to a plurality of directions in sequence (i.e. scanning). It is possible to calculate distances and directions of reflection points based on a reflection state of the laser beams. A LIDAR point cloud is a group of measurement points (i.e. the reflection points) measured by the LIDAR.

When at least one laser beam is reflected at a certain voxel $VX_i$, a measurement result value $M_i$ regarding the voxel $VX_i$ is set to "1". When all laser beams entering into a certain voxel $VX_i$ pass through without being reflected, the measurement result value $M_i$ regarding the voxel $VX_i$ is set to "0". The measurement result value $M_i$ being "1" means that some kind of object exists in the voxel $VX_i$. On the other hand, the measurement result value $M_i$ being "0" means that no object exists in the voxel $VX_i$.

The LIDAR performs the laser beam scanning repeatedly in terms of time. Accordingly, a plurality of measurement result values $M_i$ that are successive in terms of time are obtained with regard to the same voxel $VX_i$. The occupancy $R_i$ regarding the voxel $VX_i$ is defined by an average value of the plurality of measurement result values $M_i$. When the number of measurements is $N_i$, the occupancy $R_i$ regarding the voxel $VX_i$ is expressed by the following Equation (1).

[Equation 1]
$$R_i = \frac{1}{N_i}\sum^{N_i} M_i \tag{1}$$

Moreover, every time the vehicle 1 passes a same road, the measurement result value $M_i$ regarding the voxel $VX_i$ is newly obtained and the occupancy $R_i$ is calculated again. That is, the occupancy $R_i$ is updated.

The evaluation value $P_i$ indicates certainty that a stationary object exists at the position $[X_i, Y_i, Z_i]$. For example, the evaluation value $P_i$ takes a value in a range from 0 to 1. The higher the evaluation value $P_i$ is, the higher the probability that a stationary object exists at the position $[X_i, Y_i, Z_i]$ is. The evaluation information is information used for calculating the evaluation value $P_1$.

For example, the evaluation information includes the number of measurements $N_i$. When the number of measurements $N_i$ is small, the evaluation value $P_i$ is low. As the number of measurements $N_i$ becomes larger, the evaluation value $P_i$ becomes higher.

The evaluation information may include variance $V_i$. The variance $V_i$ here is variance of positions of the measurement points (i.e. the reflection points) included in the voxel $VX_i$. For instance, when a wall surface exists in the voxel $VX_i$, the laser beams are reflected at the wall surface and thus a distribution of the measurement points becomes planar. In that case, the variance $V_i$ is comparatively small. Whereas, when indefinite-shape object such as smoke and weed exists in the voxel $VX_i$, the distribution of the measurement points becomes three-dimensional and thus the variance $V_i$ becomes larger. As the variance $V_i$ becomes larger, the evaluation value $P_i$ becomes lower.

The evaluation information may include the occupancy $R_i$ described above. The occupancy $R_i$ being "1" means that some object always exists in the voxel $VX_i$. The object always existing is highly likely to be a stationary object. Therefore, it can be considered to increase the evaluation value $P_i$ as the occupancy $R_i$ becomes higher.

However, merely using the above-exemplified evaluation information may not necessarily increase accuracy of the evaluation value $P_i$. Some situations where the accuracy of the evaluation value $P_i$ may be decreased are described below.

As an example, let us consider a small-area stationary object such as a chain-link fence and a median strip pole. Sometimes reflected beams from such the small-area stationary object are measured, but sometimes not. In other words, sometimes the LIDAR point cloud is obtained, and sometimes not. The same applies to a stationary object made of laser beam absorbing material. Moreover, the same applies to a case where a camera installed on the vehicle 1 is used for detecting a stationary object. Depending on an area and color of a stationary object and how light hits the stationary object, sometimes the stationary object is detected, and sometimes not. In these cases, the occupancy $R_i$ at the position of the stationary object becomes low. When the low occupancy $R_i$ as it is is used as the evaluation value $P_i$, the stationary object may be erroneously recognized as a non-stationary object. When the stationary object is erroneously recognized as a non-stationary object, unnecessary driving support control may be erroneously activated. This causes a driver's feeling of strangeness and leads to decrease in confidence in the driving support control.

As another example, let us consider a section where a parking space is provided at a side end of a road. If a parked vehicle always exists at the parking space, the occupancy $R_i$ at the position of the parking space becomes high. When the high occupancy $R_i$ as it is is used as the evaluation value $P_i$, the parked vehicle may be erroneously recognized as a stationary object (i.e. a road-related structure). When the parked vehicle is erroneously recognized as a stationary object, the vehicle 1 may pass by the vicinity of the parked vehicle at a high speed. This causes a driver's feeling of strangeness and leads to decrease in confidence in the driving support control.

In view of the above, in order to increase the accuracy of the evaluation value $P_i$, setting of the evaluation value $P_i$ according to the present embodiment is performed in consideration of the following point of view.

1-3. Setting of Evaluation Value Based on Vehicle Behavior

Figure 3:
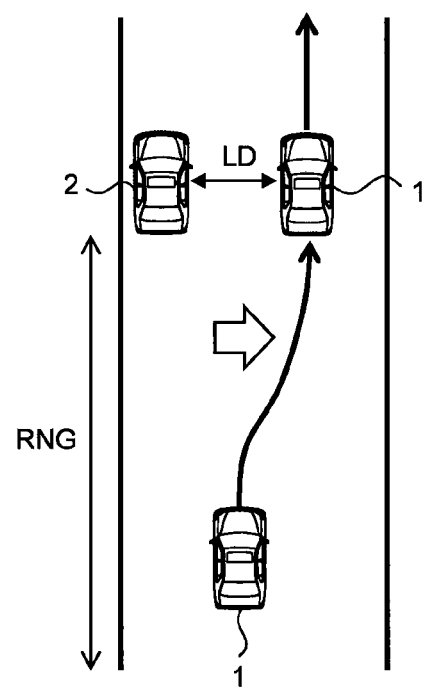
FIG. 3 is a conceptual diagram for explaining a method of setting an evaluation value by a database management device according to the embodiment of the present disclosure.

FIG. 3 shows a situation where a parked vehicle 2 exists ahead of the vehicle 1. In this situation, the driver or the driving support control device 100 makes the vehicle 1 travel at some distance from the parked vehicle 2. That is, a shortest distance (lateral distance) LD between the vehicle 1 and the parked vehicle 2 in a period when the vehicle 1 passes by a side of the parked vehicle 2 is relatively large. The driver or the driving support control device 100 may perform a steering operation in a direction to make the vehicle 1 move away from the parked vehicle 2, in a certain area RNG before the parked vehicle 2. The driver or the driving support control device 100 may decelerate the vehicle 1 in a certain area RNG before the parked vehicle 2.

Figure 4:
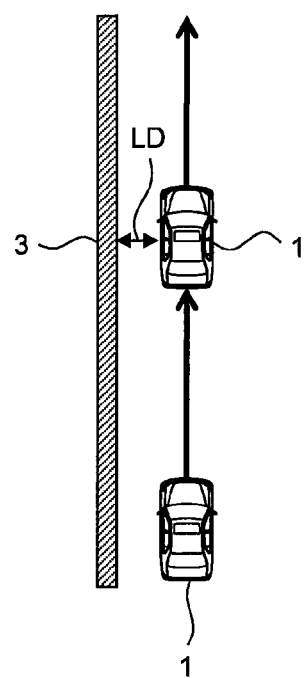
FIG. 4 is a conceptual diagram for explaining the method of setting the evaluation value by the database management device according to the embodiment of the present disclosure.

FIG. 4 shows another situation where the vehicle 1 is traveling in the vicinity of a guardrail 3. In this situation, there is no need for the driver or the driving support control device 100 to make the vehicle 1 travel at a distance from the guardrail 3. That is, the shortest distance (lateral distance) LD between the vehicle 1 and the guardrail 3 in a period when the vehicle 1 passes by a side of the guardrail 3 can be small. Moreover, there is no need for the driver or the driving support control device 100 to perform a steering operation in a direction to make the vehicle 1 move away from the guardrail 3. In addition, there is no need for the driver or the driving support control device 100 to decelerate the vehicle 1.

As described above, relative behavior of the vehicle 1 with respect to the parked vehicle 2 is totally different from relative behavior of the vehicle 1 with respect to the guardrail 3. To say it more generally, relative behavior of the vehicle 1 with respect to a "stationary object" is totally different from relative behavior of the vehicle 1 with respect to a "non-stationary object". Therefore, taking the relative behavior of the vehicle 1 into consideration makes it possible to set the evaluation value $P_i$ with higher accuracy.

Setting of the evaluation value $P_i$ is executed by the database management device 30. More specifically, the database management device 30 acquires the driving environment information 200 from the information acquisition device 20 (see FIG. 1). The driving environment information 200 includes surrounding situation information indicating a situation around the vehicle 1. An object detected by a sensor such as a LIDAR and a camera installed on the vehicle 1 is hereinafter referred to as a "detected target". The surrounding situation information includes target information on the detected target. Furthermore, the driving environment information 200 includes vehicle state information indicating a state of the vehicle 1. The state of the vehicle 1 is exemplified by a speed and an acceleration of the vehicle 1, a driving operation (i.e. an acceleration operation, a braking operation, and a steering operation) by the driver, and so forth.

Based on the driving environment information 200, the database management device 30 can recognize the relative behavior of the vehicle 1 with respect to the detected target. Vehicle behavior information indicates the relative behavior of the vehicle 1 with respect to the detected target. As shown in FIG. 2, the evaluation information according to the present embodiment includes the vehicle behavior information. The database management device 30 performs the setting of the evaluation value $P_i$ based on the vehicle behavior information. More specifically, the database management device 30 determines, based on the vehicle behavior information (i.e. the relative behavior), whether or not the detected target is the stationary object to set the evaluation value $P_i$ of the background map information BG_MAP regarding a detected position of the detected target.

The function of the database management device 30 can be achieved by the following functional blocks. A vehicle behavior recognition unit recognizes the relative behavior of the vehicle 1 with respect to the detected target to acquire the vehicle behavior information, based on the driving environment information 200. An evaluation value setting unit determines, based on the vehicle behavior information (i.e. the relative behavior), whether or not the detected target is the stationary object to set the evaluation value $P_i$ of the background map information BG_MAP regarding the detected position of the detected target. These functional blocks are realized by a processor executing a computer program stored in a memory device. The processor may be installed on the vehicle 1, or may be included in an external device outside the vehicle 1. Alternatively, the processor may be distributed to the vehicle 1 and the external device. In that case, the function of the database management device 30 is divisionally handled by the vehicle 1 and the external device.

1-4. Effects

According to the present embodiment, as described above, the database management device 30 recognizes the relative behavior of the vehicle 1 with respect to the detected target, based on the driving environment information 200. Then, the database management device 30 determines, based on the relative behavior, whether or not the detected target is the stationary object to set the evaluation value $P_i$ of the background map information BG_MAP regarding the detected position of the detected target. The relative behavior of the vehicle 1 with respect to a "stationary object" is totally different from the relative behavior of the vehicle 1 with respect to a "non-stationary object". Therefore, taking the relative behavior of the vehicle 1 into consideration makes it possible to set the evaluation value $P_i$ with higher accuracy. As a result, accuracy (quality) of the background map information BG_MAP is increased.

Since the accuracy of the background map information BG_MAP is increased, accuracy of the driving support control using the background map information BG_MAP also is increased. Accordingly, confidence in the driving support control also is increased.

Moreover, every time the vehicle 1 passes a same road, the evaluation value $P_i$ is updated and the accuracy of the evaluation value $P_i$ is further increased. That is, the accuracy (quality) of the background map information BG_MAP is further increased. As a result, the accuracy of the driving support control using the background map information BG_MAP also is further increased.

The map database MAP_DB and the database management device 30 may be installed on the vehicle 1. That is to say, all components of the map information system 10 may be installed on the vehicle 1. In that case, the map information system 10 automatically executes, in the vehicle 1, all of the acquisition of the driving environment information 200, the management of the map database MAP_DB based on the driving environment information 200, and the driving support control based on the map database MAP_DB. Such the map information system 10 can be referred to as a "self-learning driving support control system". In particular, when executing the automated driving control as the driving support control, such the map information system 10 can be referred to as a "self-learning automated driving system".

It can be said that the map database MAP_DB is useful knowledge for the driving support control. It can be said that the map information system 10 according to the present embodiment automatically executes detection, verification, and accumulation of the knowledge.

Hereinafter, the map information system 10 according to the present embodiment will be described in more detail.

2. Configuration Example of Map Information System 10

2-1. Configuration Example of Driving Support Control Device 100

Figure 5:
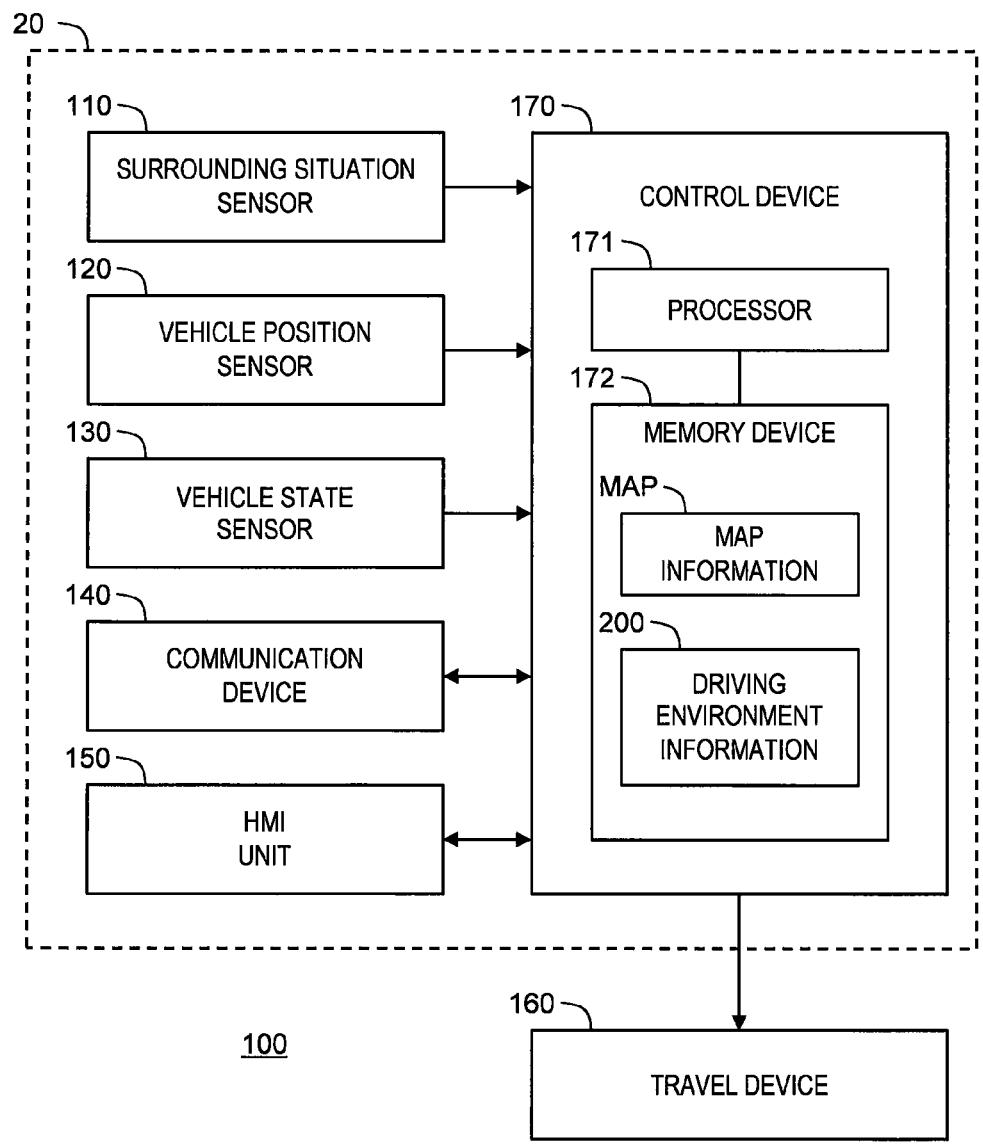
FIG. 5 is a block diagram showing a configuration example of a driving support control device according to the embodiment of the present disclosure.

FIG. 5 is a block diagram showing a configuration example of the driving support control device 100 according to the present embodiment. The driving support control device 100 is installed on the vehicle 1 and includes a surrounding situation sensor 110, a vehicle position sensor 120, a vehicle state sensor 130, a communication device 140, an HMI (Human Machine Interface) unit 150, a travel device 160, and a control device (controller) 170.

The surrounding situation sensor 110 detects (recognizes) a situation around the vehicle 1. The surrounding situation sensor 110 is exemplified by a camera (imaging device), a LIDAR (Laser Imaging Detection and Ranging), a radar, and so forth. The camera images a situation around the vehicle 1. The LIDAR uses laser beams to detect a target around the vehicle 1. The radar uses radio waves to detect a target around the vehicle 1.

The vehicle position sensor 120 detects a position and an orientation (e.g. azimuth) of the vehicle 1. For example, the vehicle position sensor 120 includes a GPS (Global Positioning System) sensor. The GPS sensor receives signals transmitted from a plurality of GPS satellites and calculates the position and the orientation of the vehicle 1 based on the received signals.

The vehicle state sensor 130 detects a state of the vehicle 1. The state of the vehicle 1 includes a speed of the vehicle 1 (i.e. a vehicle speed), an acceleration, a steering angle, a yaw rate, and so forth. The state of the vehicle 1 further includes a driving operation by a driver of the vehicle 1. The driving operation includes an acceleration operation, a braking operation, and a steering operation.

The communication device 140 communicates with the outside of the vehicle 1. For example, the communication device 140 communicates with an external device outside the vehicle 1 through a communication network. The communication device 140 may perform a V2I communication (vehicle-to-infrastructure communication) with a surrounding infrastructure. The communication device 140 may perform a V2V communication (vehicle-to-vehicle communication) with a surrounding vehicle.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The travel device 160 includes a steering device, a driving device, and a braking device. The steering device turns wheels. The driving device is a power source that generates a driving force. The driving device is exemplified by an engine and an electric motor. The braking device generates a braking force.

The control device (controller) 170 is a microcomputer including a processor 171 and a memory device 172. The control device 170 is also called an ECU (Electronic Control Unit). A variety of processing by the control device 170 is achieved by the processor 171 executing a control program stored in the memory device 172.

For example, the control device 170 acquires necessary map information MAP from the map database MAP_DB. The map information MAP includes the background map information BG_MAP described above. In addition, the map information MAP includes a road map and a navigation map commonly used. In a case where the map database MAP_DB is installed on the vehicle 1, the control device 170 acquires necessary map information MAP from the map database MAP_DB. In another case where the map database MAP_DB exists outside the vehicle 1, the control device 170 acquires necessary map information MAP through the communication device 140. The map information MAP is stored in the memory device 172 and read out from the memory device 172 to be used, as appropriate.

Moreover, the control device 170 acquires the driving environment information 200. The driving environment information 200 is stored in the memory device 172 and read out from the memory device 172 to be used, as appropriate.

Figure 6:
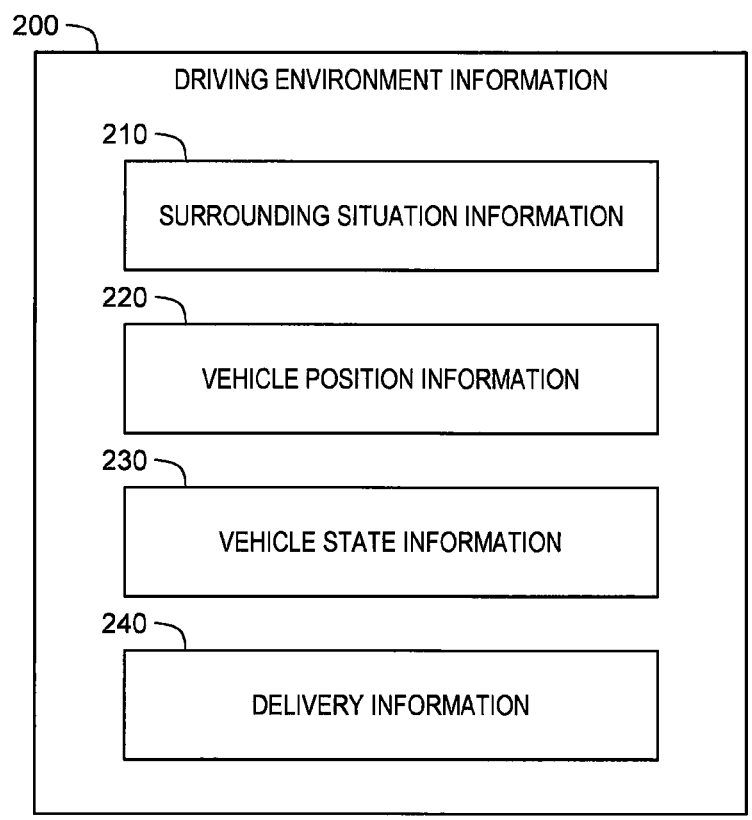
FIG. 6 is a block diagram showing an example of driving environment information used in the embodiment of the present disclosure.

FIG. 6 is a block diagram showing an example of the driving environment information 200. The driving environment information 200 includes surrounding situation information 210, vehicle position information 220, vehicle state information 230, and delivery information 240.

The surrounding situation information 210 indicates the situation around the vehicle 1. The surrounding situation information 210 is information obtained from a result of detection by the surrounding situation sensor 110. For example, the surrounding situation information 210 includes image information obtained by the camera. Moreover, the surrounding situation information 210 includes measurement information obtained by the LIDAR and the radar. The surrounding situation information 210 includes target information regarding a target detected based on the image information and the measurement information. The target around the vehicle 1 is exemplified by a stationary object, a surrounding vehicle, a pedestrian, a white line, and so forth. The target information includes a relative position, a relative velocity, and the like of the detected target with respect to the vehicle 1. The control device 170 acquires the surrounding situation information 210 based on the result of detection by the surrounding situation sensor 110.

The vehicle position information 220 indicates the position and the orientation of the vehicle 1. The control device 170 acquires the vehicle position information 220 from the vehicle position sensor 120. Furthermore, the control device 170 may execute a well-known localizing processing by the use of the target information included in the surrounding situation information 210 to increase accuracy of the vehicle position information 220.

The vehicle state information 230 indicates the state of the vehicle 1. The state of the vehicle 1 includes the speed of the vehicle 1 (i.e. the vehicle speed), the acceleration, the steering angle, the yaw rate, and so forth. The state of the vehicle 1 further includes the driving operation by the driver of the vehicle 1. The driving operation includes the acceleration operation, the braking operation, and the steering operation. The control device 170 acquires the vehicle state information 230 from the vehicle state sensor 130.

The delivery information 240 is information acquired through the communication device 140. The control device 170 acquires the delivery information 240 by using the communication device 140 to communicate with the outside of the vehicle 1. For example, the delivery information 240 includes road traffic information (e.g. road work zone information, accident information, traffic restriction information, traffic jam information) delivered from an infrastructure. The delivery information 240 may include information on the surrounding vehicle acquired through the V2V communication.

Furthermore, the control device 170 executes the driving support control based on the map information MAP and the driving environment information 200. The driving support control is exemplified by the automated driving control, the trajectory-following control, the lane keep assist control, the collision avoidance control, and so forth. For the purpose of the driving support control, the control device 170 executes vehicle travel control as appropriate. The vehicle travel control includes steering control, acceleration control, and deceleration control. The control device 170 executes the steering control, the acceleration control, and the deceleration control by appropriately actuating the travel device 160 (i.e. the steering device, the driving device, and the braking device). It can be said that the control device 170 and the travel device 160 constitute a "vehicle travel control device" that executes the vehicle travel control.

As an example of the driving support control, let us consider a case where the control device 170 executes the automated driving control. The control device 170 generates a travel plan for the vehicle 1 based on the map information MAP and the driving environment information 200. The travel plan includes a target route to a destination and a local target trajectory (e.g. a target trajectory within a lane, a target trajectory for a lane change). Moreover, the travel plan includes a vehicle travel control plan for traveling so as to follow the target trajectory, following a traffic rule, avoiding an obstacle, and so forth. The control device 170 executes the vehicle travel control such that the vehicle 1 travels in accordance with the travel plan.

2-2. Configuration Example of Information Acquisition Device 20

The information acquisition device 20 acquires the driving environment information 200. As shown in FIG. 5, the surrounding situation sensor 110, the vehicle position sensor 120, the vehicle state sensor 130, the communication device 140, and the control device 170 constitute the information acquisition device 20.

2-3. Configuration Example of Database Management Device 30

2-3-1. First Configuration Example

Figure 7:
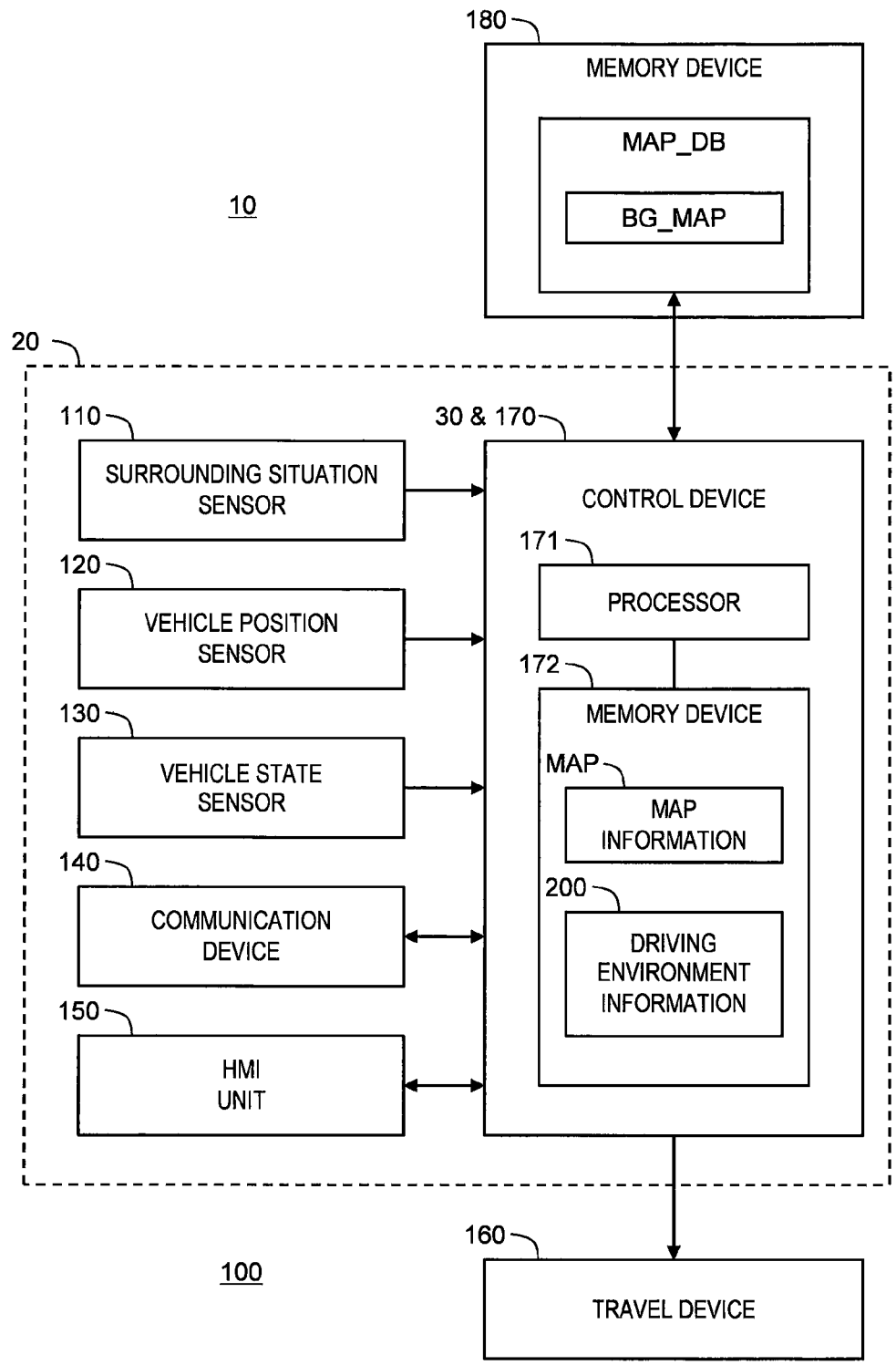
FIG. 7 is a block diagram showing a first configuration example of the database management device according to the embodiment of the present disclosure.

FIG. 7 is a block diagram showing a first configuration example of the database management device 30. In the first configuration example, the map database MAP_DB is installed on the vehicle 1 (the driving support control device 100). More specifically, the map database MAP_DB is stored in a memory device 180. The memory device 180 may be the same as the memory device 172 of the control device 170. The control device 170 (i.e. the processor 171) manages the map database MAP_DB based on the driving environment information 200. That is to say, the control device 170 serves as the database management device 30.

2-3-2. Second Configuration Example

Figure 8:
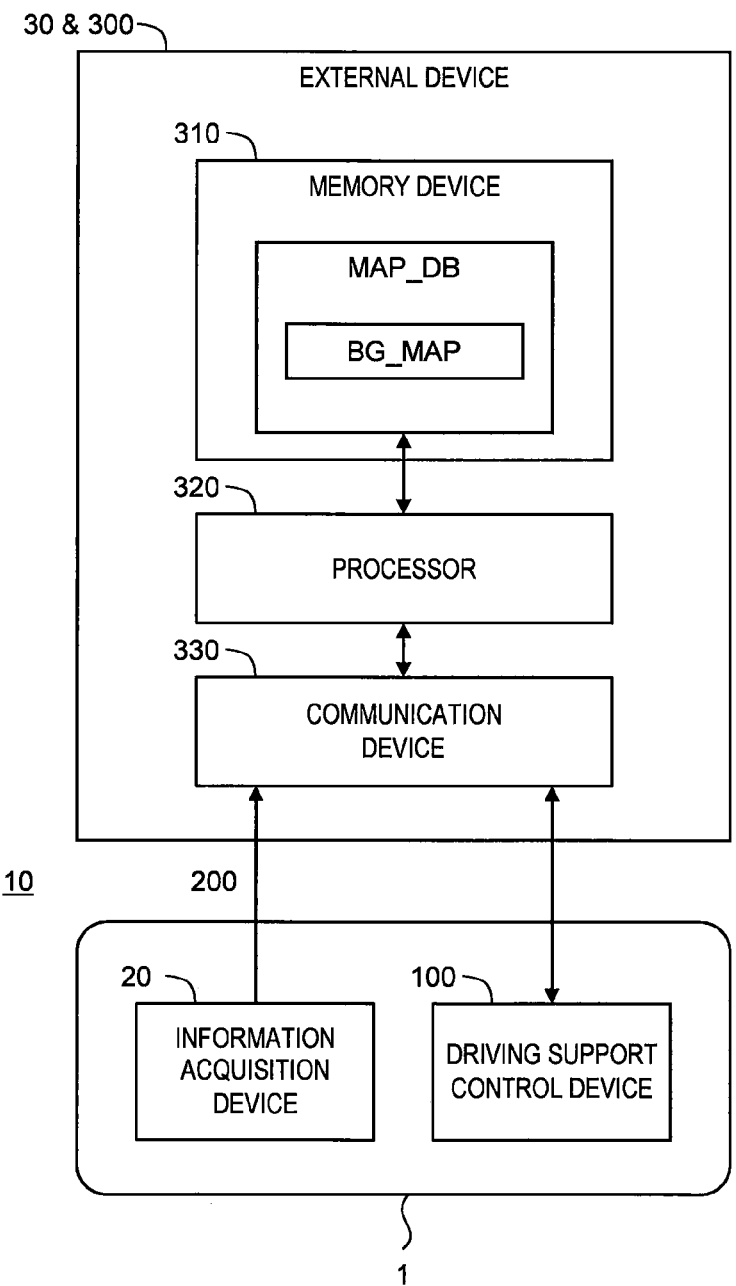
FIG. 8 is a block diagram showing a second configuration example of the database management device according to the embodiment of the present disclosure.

FIG. 8 is a block diagram showing a second configuration example of the database management device 30. In the second configuration example, the database management device 30 is realized by an external device 300 outside the vehicle 1. For example, the external device 300 is a management server.

More specifically, the external device 300 includes a memory device 310, a processor 320, and a communication device 330. The map database MAP_DB is stored in the memory device 310. The communication device 330 communicates with the communication device 140 of the vehicle 1. The processor 320 performs a variety of information processing by executing a computer program stored in the memory device 310.

The information acquisition device 20 (i.e. the control device 170) of the vehicle 1 transmits the driving environment information 200 to the external device 300 through the communication device 140. The processor 320 of the external device 300 receives the driving environment information 200 from the information acquisition device 20 through the communication device 330. Then, the processor 320 manages the map database MAP_DB based on the driving environment information 200.

Moreover, the driving support control device 100 (i.e. the control device 170) of the vehicle 1 sends a request for provision of necessary map information MAP to the external device 300 through the communication device 140. The processor 320 of the external device 300 reads the necessary map information MAP from the map database MAP_DB. Then, the processor 320 provides the map information MAP to the driving support control device 100 through the communication device 330.

2-3-3. Third Configuration Example

Figure 9:
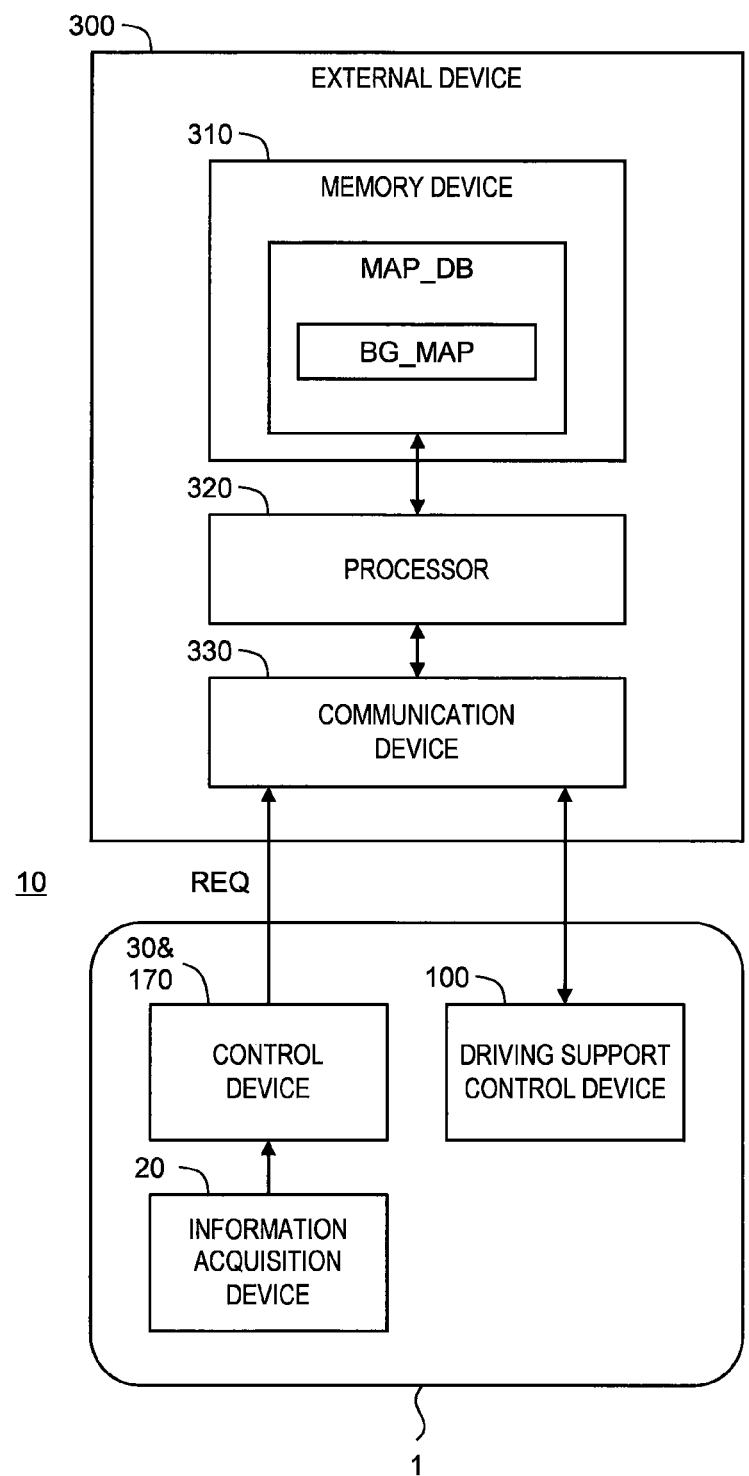
FIG. 9 is a block diagram showing a third configuration example of the database management device according to the embodiment of the present disclosure.

FIG. 9 is a block diagram showing a third configuration example of the database management device 30. In the third configuration example, the map database MAP_DB is stored in the external device 300, as in the case of the second configuration example. Meanwhile, the database management device 30 is realized by the control device 170 of the vehicle 1. That is, the control device 170 (i.e. the processor 171) remotely manipulates the map database MAP_DB on the side of the external device 300.

More specifically, the control device 170 acquires the driving environment information 200 from the information acquisition device 20. Based on the driving environment information 200, the control device 170 executes processing such as recognizing the relative behavior and setting the evaluation value. When performing registration or update of the background map information BG_MAP, the control device 170 transmits a request signal REQ requesting for registration or update to the external device 300 through the communication device 140. The request signal REQ includes information necessary for the registration or the update. The processor 320 of the external device 300 receives the request signal REQ through the communication device 330. Then, the processor 320 performs the registration or the update of the background map information BG_MAP in accordance with the request signal REQ.

2-3-4. Fourth Configuration Example

The functions of the database management device 30 may be distributed to the control device 170 (i.e. the processor 171) of the vehicle 1 and the processor 320 of the external device 300. That is, the above-described functional blocks such as the vehicle behavior recognition unit and the evaluation value setting unit may be distributed to the control device 170 (i.e. the processor 171) and the processor 320.

It is possible to summarize the first to fourth configuration examples as follows. That is, one processor (i.e. the processor 171 or the processor 320) or multiple processors (i.e. the processor 171 and the processor 320) serve as the database management device 30.

3. Initial Generation of Background Map Information

Figure 10:
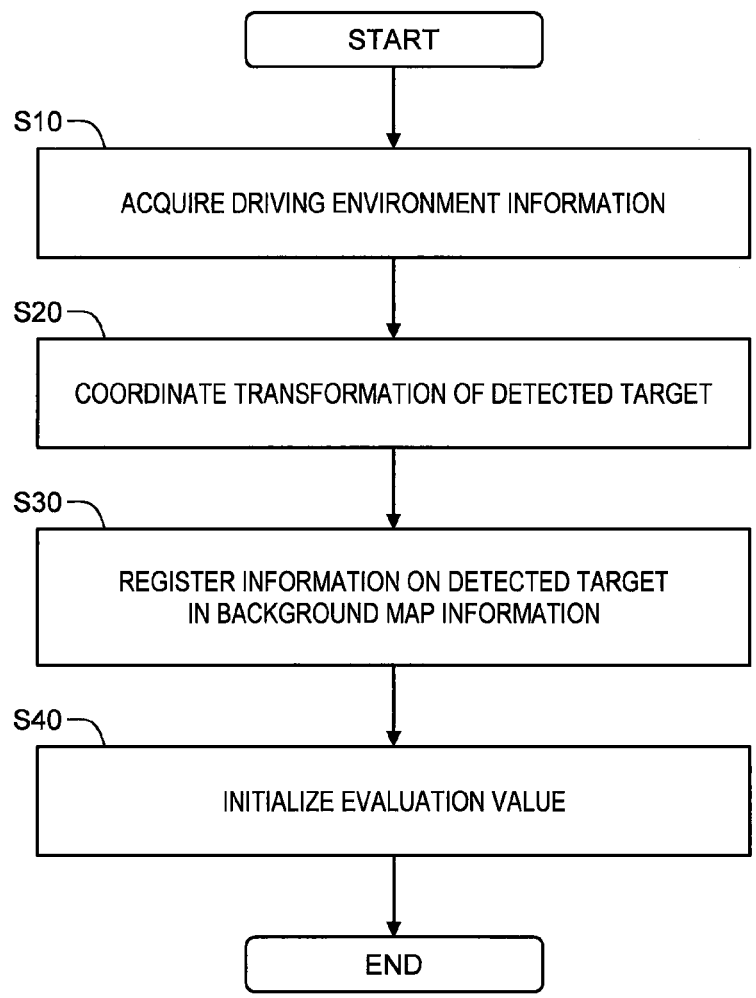
FIG. 10 is a flow chart showing initial generation of the background map information by the database management device according to the embodiment of the present disclosure.

Let us consider a case where the vehicle 1 travels in a road whose background map information BG_MAP is not yet generated. In that case, the database management device 30 executes initial generation of the background map information BG_MAP with regard to the road. FIG. 10 is a flow chart showing the initial generation of the background map information BG_MAP by the database management device 30.

In Step S10, the database management device 30 acquires the driving environment information 200 from the information acquisition device 20. As mentioned above, the driving environment information 200 includes the surrounding situation information 210. The surrounding situation information 210 includes the target information regarding the detected target detected by the surrounding situation sensor 110. The target information includes a relative position, a relative velocity, and the like of the detected target with respect to the vehicle 1.

In Step S20, the database management device 30 transforms (converts) the detected position of the detected target to that in the absolute coordinate system. In other words, the database management device 30 associates the detected position of the detected target with the position in the background map information BG_MAP. The driving environment information 200 includes the vehicle position information 220. Based on the position and the orientation of the vehicle 1 indicated by the vehicle position information 220, the database management device 30 can transform the detected position of the detected target to that in the absolute coordinate system.

In Step S30, the database management device 30 registers information on the detected target in the background map information BG_MAP. As an example, let us consider a case where the background map information BG_MAP has the data structure as shown in FIG. 2. The data set regarding the voxel $VX_i$ at the position $[X_i, Y_i, Z_i]$ is calculated from the surrounding situation information 210 regarding the detected target included in the voxel $VX_i$. For example, the number of measurements $N_i$, the variance $V_i$, and the occupancy $R_i$ are calculated from the LIDAR measurement information included in the surrounding situation information 210.

The database management device 30 may refrain from registering the data set in the background map information BG_MAP until the number of measurements $N_i$ reaches a threshold. In that case, the database management device 30 registers the data set regarding the voxel $VX_i$ where the number of measurements $N_i$ is equal to or larger than the threshold, in the background map information BG_MAP.

In Step S40, the database management device 30 initializes the evaluation value $P_i$ regarding the voxel $VX_i$ registered in the above Step S30. For example, an initial value of the evaluation value $P_i$ is a fixed value. Alternatively, the initial value of the evaluation value $P_i$ may be calculated based on the evaluation information. An an example, the initial value of the evaluation value $P_i$ is higher as the number of measurements $N_i$ is larger. As another example, the initial value of the evaluation value $P_i$ is lower as the variance $V_i$ is larger. As still another example, the initial value of the evaluation value $P_i$ is higher as the occupancy $R_i$ is higher.

In this manner, after the vehicle 1 travels through a certain road at least once, the initial generation of the background map information BG_MAP regarding the certain road can be executed based on the travel result (i.e. the driving environment information 200). After the vehicle 1 travels through the same road for multiple times, the initial generation of the background map information BG_MAP regarding the same road may be executed based on the multiple travel results (i.e. a set of multiple driving environment information 200).

4. Update of Background Map Information

Figure 11:
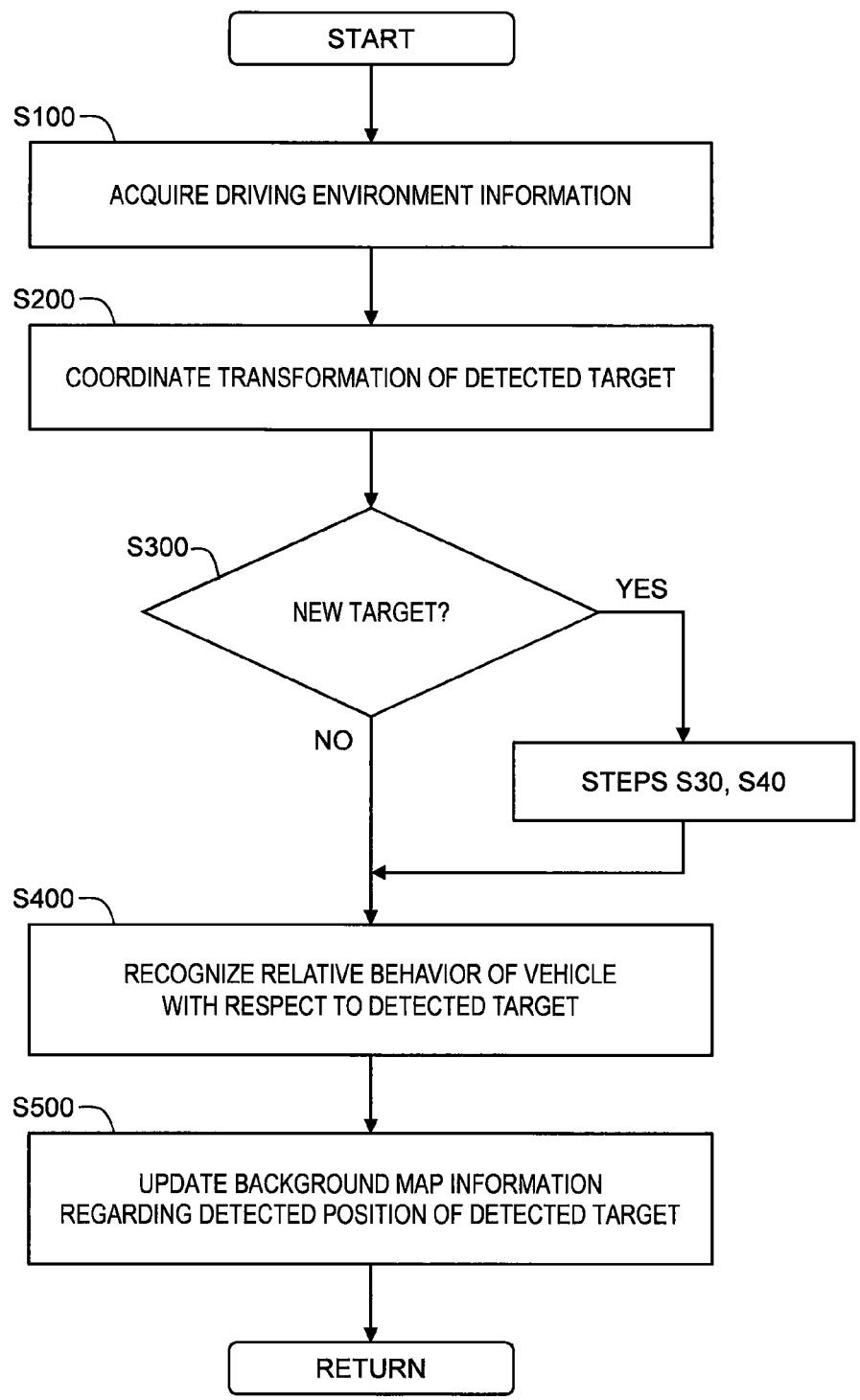
FIG. 11 is a flow chart showing update of the background map information by the database management device according to the embodiment of the present disclosure.

Next, we describe update of the background map information BG_MAP. FIG. 11 is a flow chart showing the update of the background map information BG_MAP by the database management device 30.

In Step S100, the database management device 30 acquires the driving environment information 200 from the information acquisition device 20. This Step S100 is similar to Step S10 described above. It should be noted that an example of the driving environment information 200 here is the one acquired when the driver is performing manual driving. Alternatively, the driver may perform manual driving (overriding) as necessary during the driving support control by the driving support control device 100.

In Step S200, the database management device 30 transforms (converts) the detected position of the detected target to that in the absolute coordinate system. In other words, the database management device 30 associates the detected position of the detected target with the position in the background map information BG_MAP. This Step S200 is similar to Step S20 described above.

In Step S300, the database management device 30 checks the existing background map information BG_MAP regarding the detected position of the detected target. If the detected target is a new target that is not yet registered in the existing background map information BG_MAP (Step S300; Yes), the database management device 30 executes processing similar to Steps S30 and S40 described above. After that, the processing proceeds to Step S400. Otherwise (Step S300; No), the processing proceeds to Step S400.

In Step S400, the database management device 30 recognizes the relative behavior of the vehicle 1 with respect to the detected target to acquire the vehicle behavior information, based on the driving environment information 200. The followings are examples of the relative behavior of the vehicle 1 with respect to the detected target.

[A] A relative distance between the detected target and the vehicle 1

[B] A steering operation in a certain area RNG before the detected target (see FIG. 3)

[C] Deceleration of the vehicle 1 in a certain area RNG before the detected target

[D] A trajectory of the vehicle 1 in a period when passing by a side of the detected target The target information included in the surrounding situation information 210 indicates the relative position of the detected target with respect to the vehicle 1. Therefore, the relative behavior [A] can be recognized based on the surrounding situation information 210 (the target information). The vehicle state information 230 indicates at least one of the speed (vehicle speed) and the acceleration of the vehicle 1 and the driving operation (i.e. the acceleration operation, the braking operation, and the steering operation). Therefore, the relative behavior [B] and [C] can be recognized based on the surrounding situation information 210 (the target information) and the vehicle state information 230. The relative behavior [D] can be recognized based on the surrounding situation information 210 (the target information) and the vehicle position information 220.

In Step S500, the database management device 30 updates the background map information BG_MAP regarding the detected position of the detected target. As an example, let us consider a case where the background map information BG_MAP has the data structure as shown in FIG. 2. The database management device 30 updates the data set regarding the voxel $VX_i$ at the position $[X_i, Y_i, Z_i]$. For example, the database management device 30 calculates respective latest values of the number of measurements $N_i$, the variance $V_i$, and the occupancy $R_i$, based on the LIDAR measurement information included in the surrounding situation information 210.

Furthermore, the database management device 30 executes "evaluation value update processing" that updates the evaluation value $P_i$ based on the latest evaluation information. For example, the database management device 30 may update the evaluation value $P_i$ based on the latest number of measurements $N_i$ and variance $V_i$.

According to the present embodiment, the evaluation information includes the relative behavior (i.e. the vehicle behavior information) recognized in Step S400. The database management device 30 executes the evaluation value update processing in consideration of the relative behavior. In other words, the database management device 30 determines, based on the relative behavior, whether or not the detected target is the stationary object to set (update) the evaluation value $P_i$ of the background map information BG_MAP regarding the detected position of the detected target. Hereinafter, various examples of the evaluation value update processing based on the relative behavior will be described.

Figure 12:
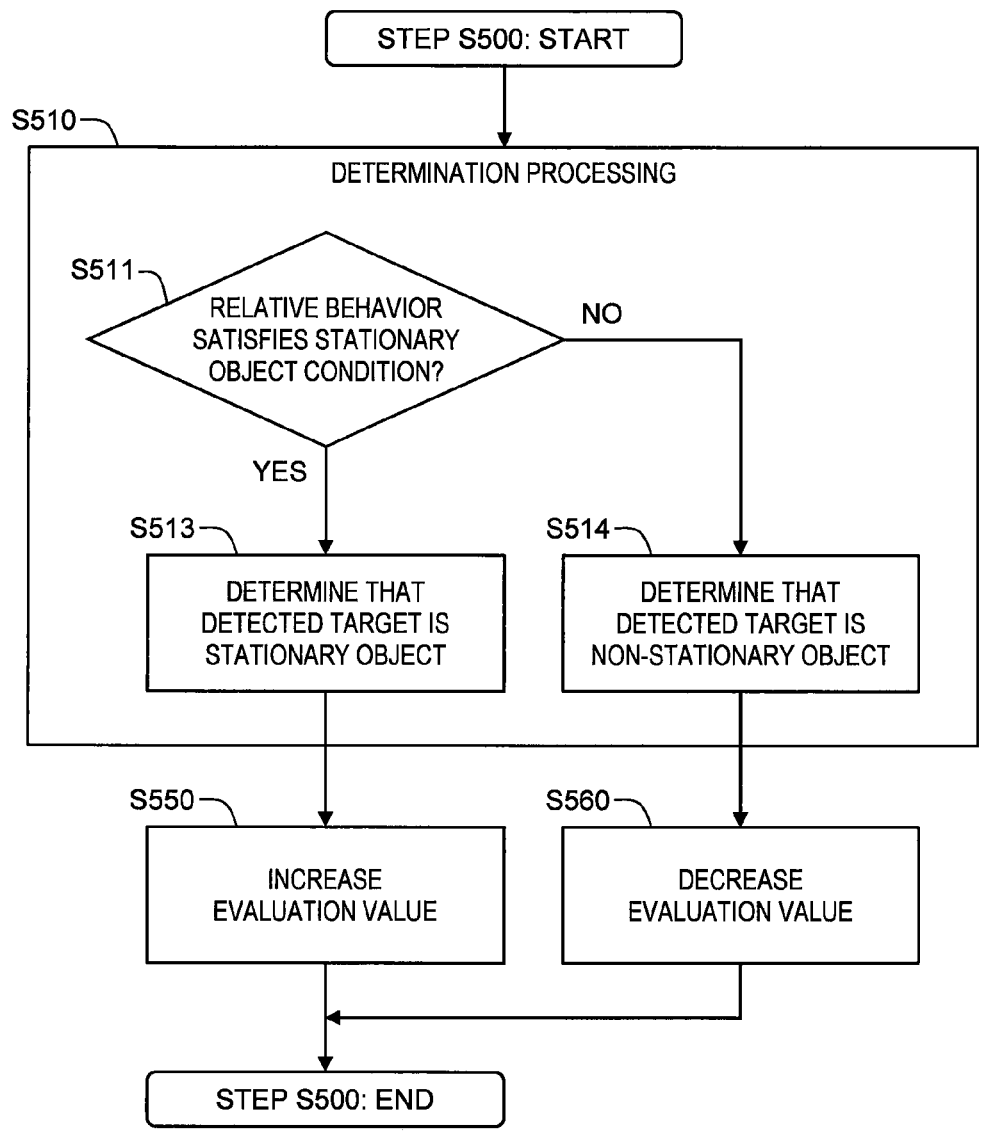
FIG. 12 is a flow chart showing a first example of evaluation value update processing by the database management device according to the embodiment of the present disclosure.

5. Various Examples of Evaluation Value Update Processing Based on Relative Behavior 5-1. First Example FIG. 12 is a flow chart showing a first example of the evaluation value update processing. In Step S510, the database management device 30 executes determination processing that determines whether or not the detected target is the stationary object. The determination processing is executed for each detected position of the detected target (i.e. for each position $[X_i, Y_i, Z_i]$ of the voxel $VX_i$).

More specifically, in Step S511, the database management device 30 determines, based on the vehicle behavior information, whether or not the relative behavior satisfies a "stationary object condition (first condition)". The stationary object condition is a condition for determining that the detected target is the stationary object.

As an example, let us consider the shortest distance LD between the vehicle 1 and the detected target in a period when the vehicle 1 passes by a side of the detected target (see FIGS. 3 and 4). When the vehicle 1 passes by a side of a "non-stationary object" such as the parked vehicle 2, the vehicle 1 travels at some distance from the non-stationary object and thus the shortest distance LD is relatively large (see FIG. 3). Conversely, when the shortest distance LD is small, the detected target is likely to be an "object not requiring to be distant", that is, the "stationary object" (see FIG. 4). From this point of view, the stationary object condition includes that "the shortest distance LD is less than a distance threshold LDth". Whether or not this stationary object condition is satisfied can be determined based on the above-described relative behavior [A], that is, the surrounding situation information 210 (i.e. the target information).

It is also conceivable that the vehicle 1 decelerates and then passes by the vicinity of the parked vehicle 2 at a very low speed. In order to prevent erroneous determination that the parked vehicle 2 is the stationary object in that situation, the stationary object condition may further include an additional condition. More specifically, the stationary object condition may further include an additional condition that "no deceleration of the vehicle 1 occurs in a certain area RNG before the detected target". Whether or not this stationary object condition is satisfied can be determined based on the above-described relative behavior [C], that is, the surrounding situation information 210 (the target information) and the vehicle state information 230.

When the relative behavior satisfies the stationary object condition (Step S511; Yes), the database management device 30 determines that the detected target is the "stationary object" (Step S513). In that case, the processing proceeds to Step S550. On the other hand, when the relative behavior does not satisfy the stationary object condition (Step S511; No), the database management device 30 determines that the detected target is the "non-stationary object" (Step S514). In that case, the processing proceeds to Step S560.

In Step S550, the database management device 30 increases the evaluation value $P_i$ of the background map information BG_MAP regarding the detected position of the detected target from a previous value.

In Step S560, the database management device 30 decreases the evaluation value $P_i$ of the background map information BG_MAP regarding the detected position of the detected target from the previous value.

According to the first example, as described above, the evaluation value $P_i$ is updated with high accuracy based on the relative behavior. Every time the vehicle 1 passes a same road, the evaluation value $P_i$ is updated and the accuracy of the evaluation value $P_i$ is further increased. That is, the accuracy (quality) of the background map information BG_MAP is further increased. As a result, the accuracy of the driving support control using the background map information BG_MAP also is further increased.

5-2. Second Example

Figure 13:
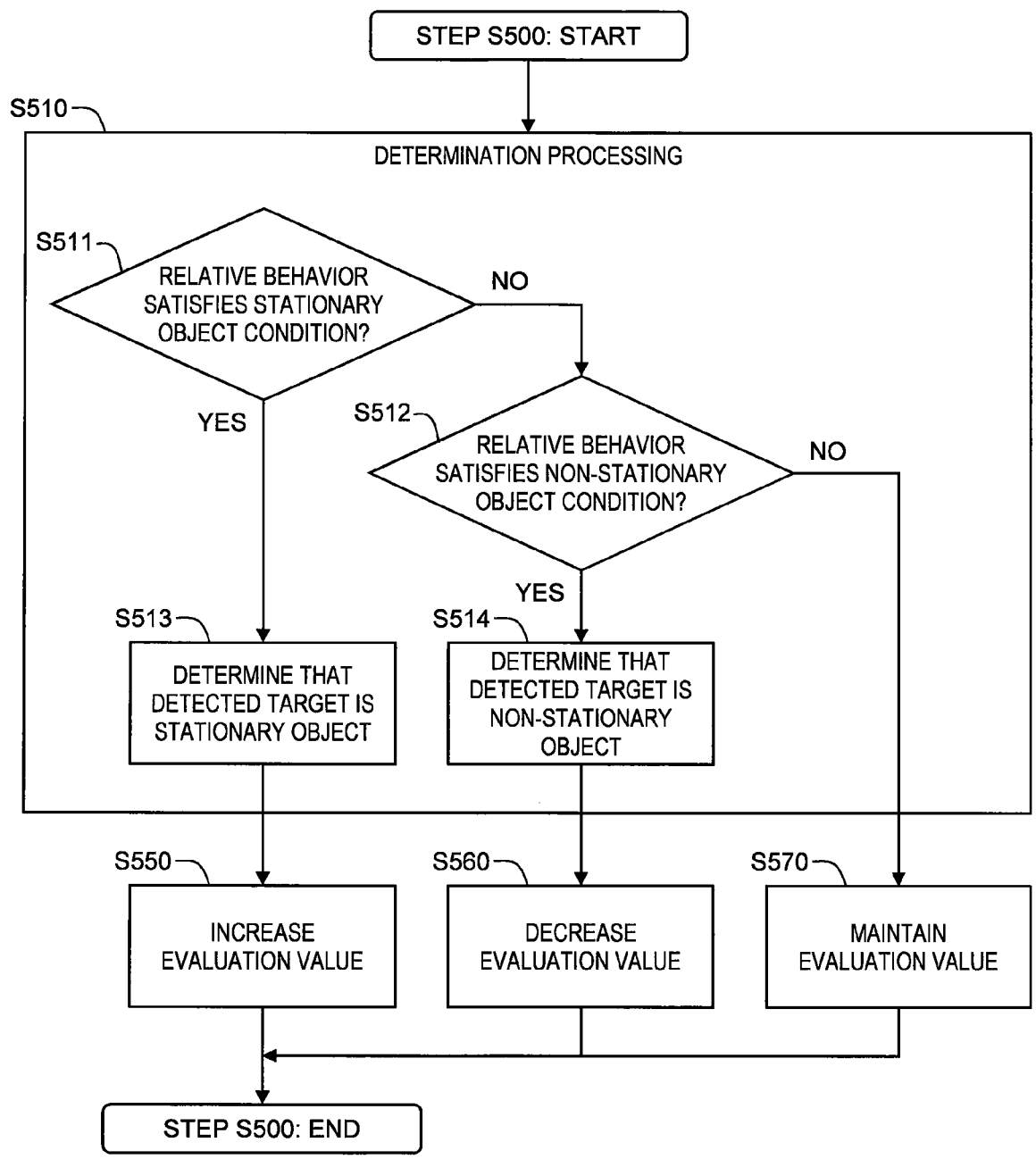
FIG. 13 is a flow chart showing a second example of the evaluation value update processing by the database management device according to the embodiment of the present disclosure.

FIG. 13 is a flow chart showing a second example of the evaluation value update processing. An overlapping description with the above-described first example (see FIG. 12) will be omitted as appropriate.

When the relative behavior does not satisfy the stationary object condition (Step S511; No), the processing proceeds to Step S512. In Step S512, the database management device 30 determines, based on the vehicle behavior information, whether or not the relative behavior satisfies a "non-stationary object condition (second condition)". The non-stationary object condition is a condition for determining that the detected target is the non-stationary object.

For example, the non-stationary object condition includes that "the steering operation in a direction to make the vehicle 1 move away from the detected target is performed in a certain area RNG before the detected target" (see FIG. 3). Whether or not this non-stationary object condition is satisfied can be determined based on the above-described relative behavior [B], that is, the surrounding situation information 210 (the target information) and the vehicle state information 230.

As another example, the non-stationary object condition may include that "deceleration of the vehicle 1 occurs in a certain area RNG before the detected target". Whether or not this non-stationary object condition is satisfied can be determined based on the above-described relative behavior [C], that is, the surrounding situation information 210 (the target information) and the vehicle state information 230.

As still another example, the non-stationary object condition may include that "the shortest distance LD is equal to or larger than the distance threshold LDth". Whether or not this non-stationary object condition is satisfied can be determined based on the above-described relative behavior [A], that is, the surrounding situation information 210 (i.e. the target information).

As still another example, the non-stationary object condition may include that "the vehicle 1 passes by a side of the detected target along a trajectory that greatly deviates from past some trajectories". The past some trajectories are registered as trajectory map information in the map database MAP_DB. Whether or not this non-stationary object condition is satisfied can be determined based on the above-described relative behavior [D], that is, the surrounding situation information 210 (the target information) and the vehicle position information 220.

The non-stationary object condition may be a combination of some examples described above.

When the relative behavior satisfies the non-stationary object condition (Step S512; Yes), the database management device 30 determines that the detected target is the "non-stationary object" (Step S514). In that case, the processing proceeds to Step S560. On the other hand, when the relative behavior does not satisfy the non-stationary object condition (Step S512; No), the processing proceeds to Step S570.

In Step S570, the database management device 30 maintains the evaluation value $P_i$ of the background map information BG_MAP regarding the detected position of the detected target.

According to the second example described above, it is possible to determine the "non-stationary object" with high accuracy.

5-3. Third Example

Figure 14:
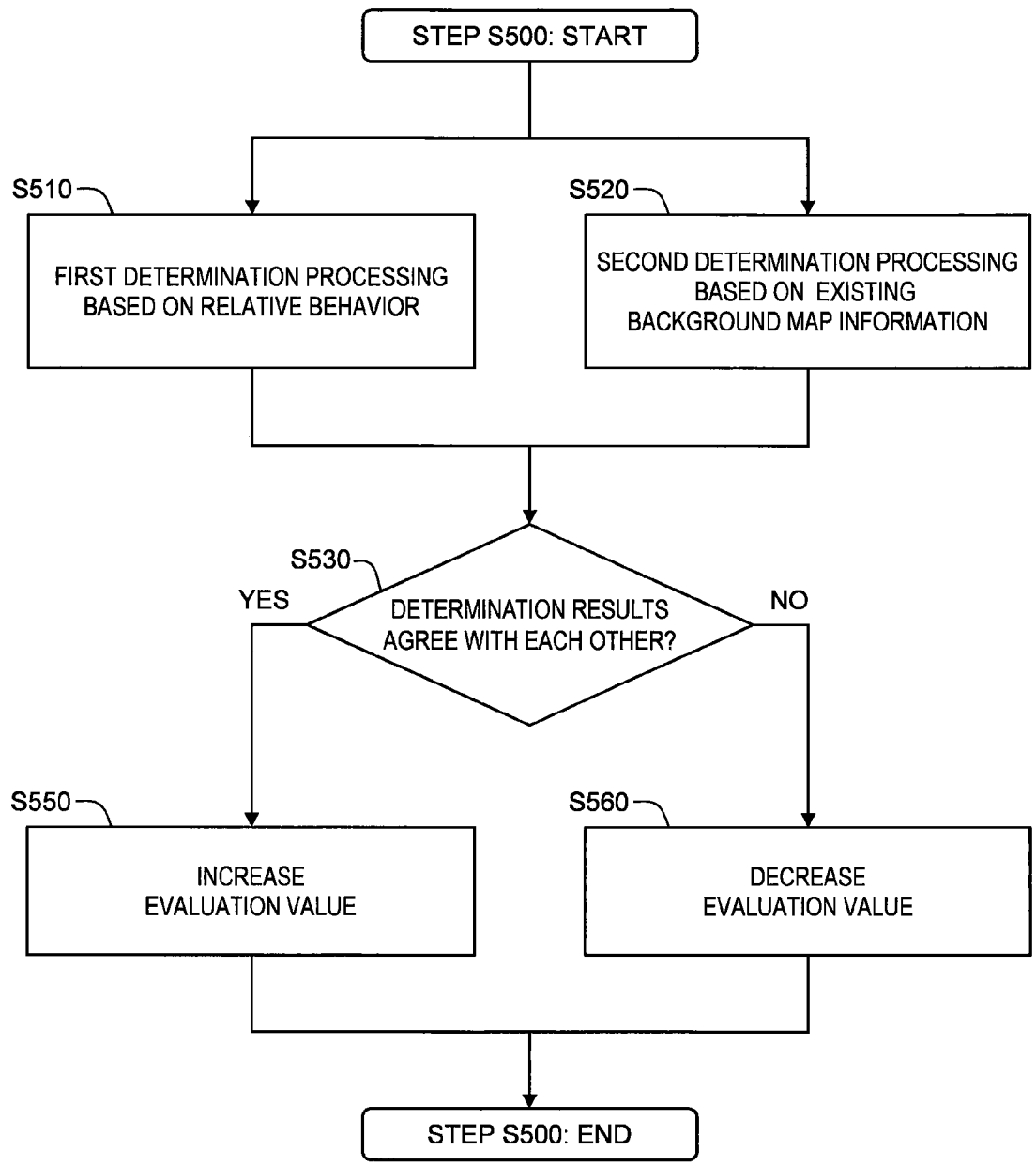
FIG. 14 is a flow chart showing a third example of the evaluation value update processing by the database management device according to the embodiment of the present disclosure.

FIG. 14 is a flow chart showing a third example of the evaluation value update processing. An overlapping description with the foregoing examples will be omitted as appropriate.

In Step S510, as described above, the database management device 30 executes the determination processing based on the relative behavior (i.e. the vehicle behavior information). The determination processing of Step S510 is hereinafter referred to as "first determination processing".

According to the third example, the database management device 30 executes "second determination processing" (Step S520) separately from the first determination processing. In the second determination processing, the database management device 30 determines whether or not the detected target is the stationary object based on the existing background map information BG_MAP.

More specifically, the database management device 30 reads out the evaluation value $P_i$ of the existing background map information BG_MAP regarding the detected position of the detected target. When the evaluation value $P_i$ is equal to or higher than a predetermined value (e.g. 0.8), the database management device 30 determines that the detected target is the "stationary object". On the other hand, when the evaluation value $P_i$ is less than the predetermined value, the database management device 30 determines that the detected target is the "non-stationary object".

In Step S530, the database management device 30 makes a comparison between a result of the first determination processing and a result of the second determination processing. When the result of the first determination processing and the result of the second determination processing agree with each other (Step S530; Yes), the processing proceeds to Step S550. On the other hand, when the result of the first determination processing and the result of the second determination processing do not agree with each other (Step S530; No), the processing proceeds to Step S560.

According to the third example described above, it is possible to verify the evaluation value $P_i$ of the existing database management device 30.

5-4. Fourth Example

Figure 15:
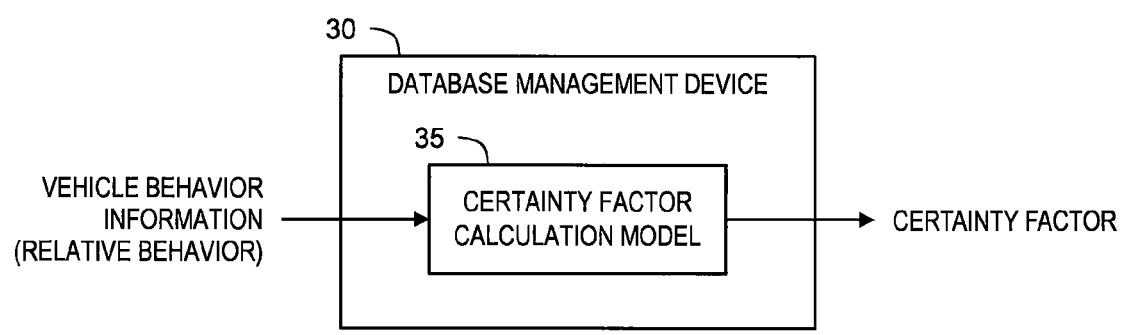
FIG. 15 is a block diagram for explaining a fourth example of the evaluation value update processing by the database management device according to the embodiment of the present disclosure.

FIG. 15 is a block diagram for explaining a fourth example of the evaluation value update processing. According to the fourth example, the database management device 30 has a certainty factor calculation model 35. The certainty factor calculation model 35 calculates a "certainty factor CF" of the detected target being the stationary object. An input to the certainty factor calculation model 35 is the vehicle behavior information (i.e. the relative behavior). That is, the certainty factor calculation model 35 calculates the certainty factor CF based on the vehicle behavior information. For example, the certainty factor CF takes a value in a range from 0 to 1.

The certainty factor calculation model 35 is beforehand created through machine learning or multiple regression analysis. For example, lots of vehicle behavior information when the vehicle 1 passes by sides of various known objects are collected. Correct data when the known object is the stationary object is 1.0. On the other hand, correct data when the known object is the non-stationary object is 0.0. The certainty factor calculation model 35 is created by performing machine learning by the use of a large number of combinations of the vehicle behavior information (input) and the correct data (output). The certainty factor calculation model 35 thus created is beforehand stored in the memory device of the database management device 30 (the memory device 172 shown in FIG. 7 or the memory device 310 shown in FIG. 8).

Figure 16:
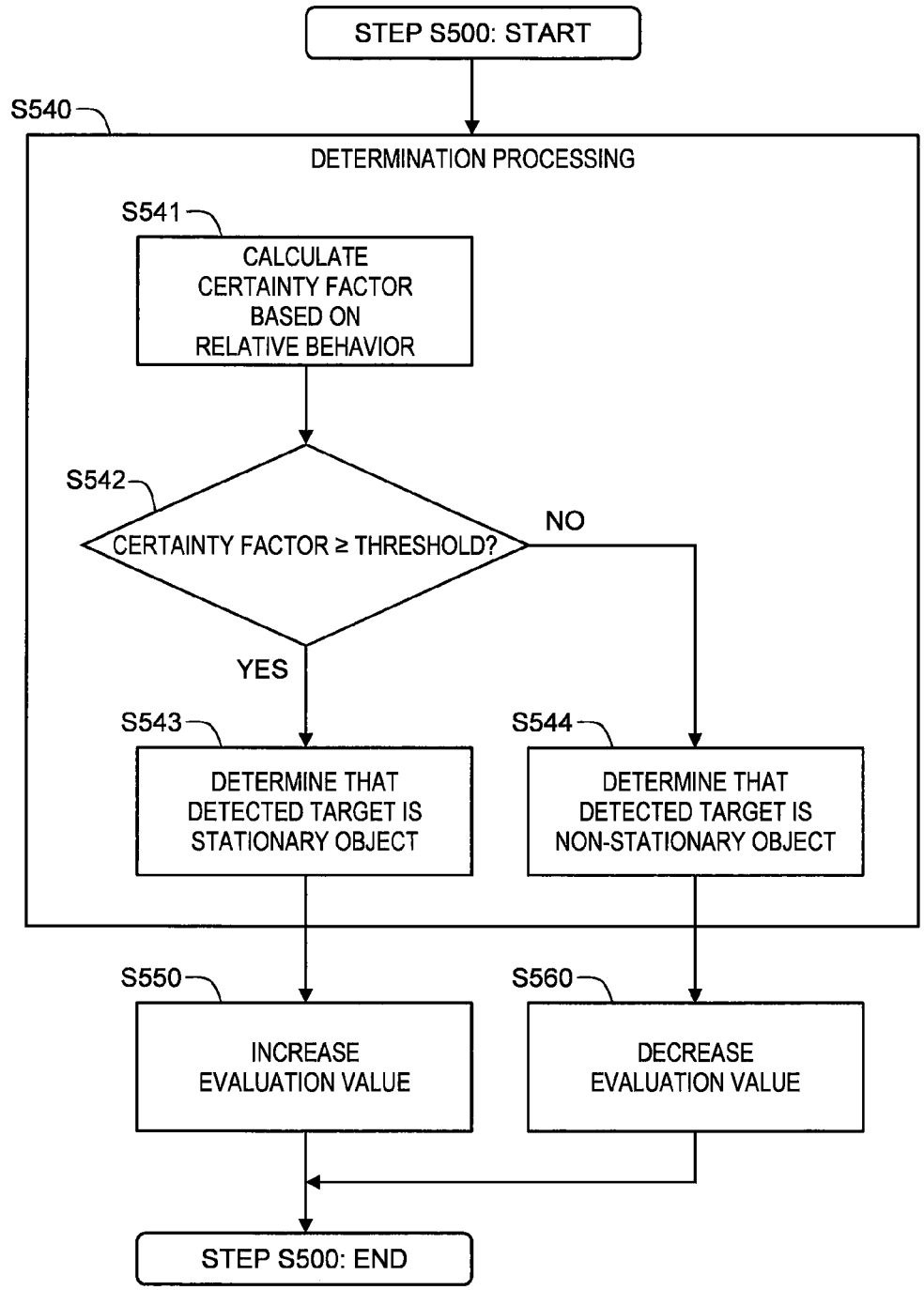
FIG. 16 is a flow chart showing the fourth example of the evaluation value update processing by the database management device according to the embodiment of the present disclosure.

FIG. 16 is a flow chart showing the fourth example of the evaluation value update processing. An overlapping description with the foregoing examples will be omitted as appropriate. In Step S540, the database management device 30 executes determination processing that determines whether or not the detected target is the stationary object. The determination processing is executed for each detected position of the detected target (i.e. for each position $[X_i, Y_i, Z_i]$ of the voxel $VX_i$).

More specifically, in Step S541, the database management device 30 input the vehicle behavior information to the certainty factor calculation model 35 to calculate the certainty factor CF. In other words, the database management device 30 calculates the certainty factor CF based on the relative behavior.

In subsequent Step S542, the database management device 30 compares the certainty factor CF with a certainty factor threshold CFth. When the certainty factor CF is equal to or higher than the certainty factor threshold CFth (Step S542; Yes), the database management device 30 determines that the detected target is the "stationary object" (Step S543). In that case, the processing proceeds to Step S550. On the other hand, when the certainty factor CF is lower than the certainty factor threshold CFth (Step S542; No), the database management device 30 determines that the detected target is the "non-stationary object" (Step S544). In that case, the processing proceeds to Step S560.

The fourth example described above also can achieve the same effects as in the first example.

5-5. Fifth Example

Figure 17:
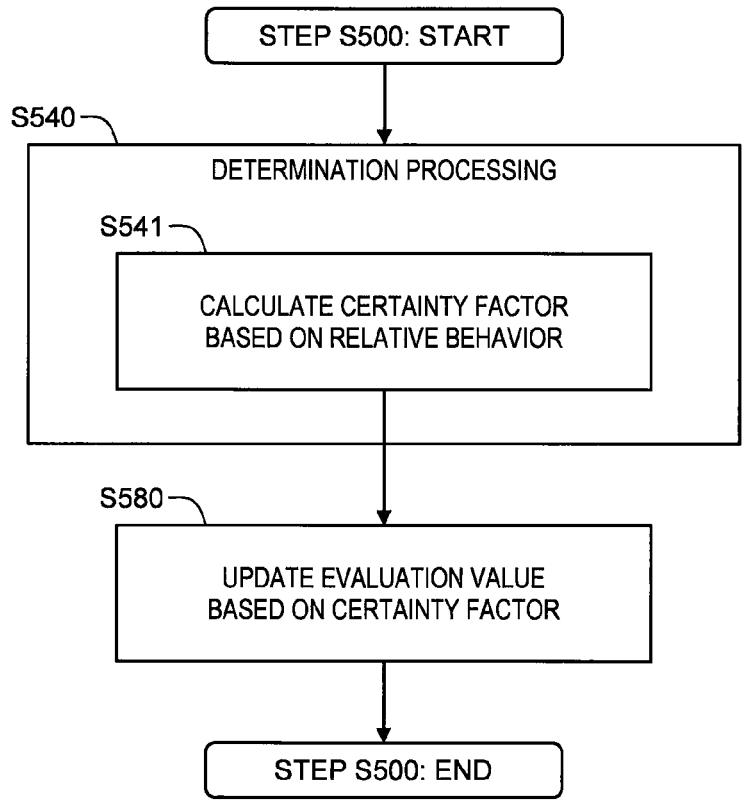
FIG. 17 is a flow chart showing a fifth example of the evaluation value update processing by the database management device according to the embodiment of the present disclosure.

FIG. 17 is a flow chart showing a fifth example of the evaluation value update processing. The fifth example is a modification example of the fourth example described above. An overlapping description with the fourth example will be omitted as appropriate.

After the certainty factor CF is calculated in Step S541, the processing proceeds to Step S580. In Step S580, the database management device 30 uses the certainty factor CF to directly calculate the latest evaluation value $P_i$. That is, the database management device 30 directly updates the evaluation value $P_i$, based on the certainty factor CF. An equation for updating the evaluation value $P_i$, is exemplified by the following Equations (2) and (3).

[Equation 2]

$$P_i[t]=P_i[t-1]+\alpha \times (CF-0.5) \qquad (2)$$

[Equation 3]

$$P_i[t]=\beta \times CF+(1-\beta) \times P_i[t-1] \qquad (3)$$

In Equations (2) and (3), each of the evaluation value $P_i$ and the certainty factor CF takes a value in a range from 0 to 1. $P_i[t-1]$ is the previous value of the evaluation value $P_i$, and $P_i[t]$ is the latest value of the evaluation value $P_1$. Parameters $\alpha$ and $\beta$ are positive coefficients.

The fifth example described above also can achieve the same effects as in the first example.

What is claimed is:

1. The A map information system comprising:
a database management device configured to manage a map database used for driving support control that supports driving of a vehicle, wherein
the map database includes background map information that indicates a position of a stationary object and an evaluation value,
the evaluation value indicates certainty that the stationary object exists at the position indicated by the background map information,
driving environment information indicating driving environment for the vehicle includes:
surrounding situation information including information on a detected target that is detected by a sensor installed on the vehicle; and
vehicle state information indicating a state of the vehicle, and the database management device is further configured to:
recognize relative behavior of the vehicle with respect to the detected target, based on the driving environment information, wherein the relative behavior with respect to the stationary object is different from the relative behavior with respect to a non-stationary object and
determine, based on the recognized relative behavior with respect to the detected target, whether the detected target is the stationary object or the non-stationary object to set the evaluation value of the background map information regarding a detected position of the detected target, wherein
based on a determination that the detected target is the stationary object, the database management device increases the evaluation value of the background map information regarding the detected position from a previous value, and
based on a determination that the detected target is the non-stationary object, the database management device decreases the evaluation value of the background map information regarding the detected position from the previous value.

2. A map information system comprising:

a database management device configured to manage a map database used for driving support control that supports driving of a vehicle, wherein the map database includes background map information that indicates a position of a stationary object and an evaluation value, the evaluation value indicates certainty that the stationary object exists at the position indicated by the background map information, driving environment information indicating driving environment for the vehicle includes:

surrounding situation information including information on a detected target that is detected by a sensor installed on the vehicle; and vehicle state information indicating a state of the vehicle, and the database management device is further configured to:

recognize relative behavior of the vehicle with respect to the detected target, based on the driving environment information, wherein the relative behavior with respect to the stationary object is different from the relative behavior with respect to a non-stationary object; and determine, based on the recognized relative behavior with respect to the detected target, whether the detected target is the stationary object or the non-stationary object to set the evaluation value of the background map information regarding a detected position of the detected target, wherein determining whether or not the detected target is the stationary object based on the relative behavior is first determination processing, the database management device is further configured to execute second determination processing that determines whether the detected target is the stationary object based on whether the evaluation value of the background map information regarding the detected position of the detected target is equal to or higher than a predetermined value, based on a result of the first determination processing and a result of the second determination processing agreeing with each other, the database management device is further configured to increase the evaluation value of the background map information regarding the detected position from a previous value, and based on the result of the first determination processing and the result of the second determination processing not agreeing with each other, the database management device is further configured to decrease the evaluation value of the background map information regarding the detected position from the previous value.

3. A map information system comprising:

a database management device configured to manage a map database used for driving support control that supports driving of a vehicle, wherein the map database includes background map information that indicates a position of a stationary object and an evaluation value, the evaluation value indicates certainty that the stationary object exists at the position indicated by the background map information, driving environment information indicating driving environment for the vehicle includes:

surrounding situation information including information on a detected target that is detected by a sensor installed on the vehicle; and vehicle state information indicating a state of the vehicle, and the database management device is further configured to:

recognize relative behavior of the vehicle with respect to the detected target, based on the driving environment information, wherein the relative behavior with respect to the stationary object is different from the relative behavior with respect to a non-stationary object; and determine, based on the recognized relative behavior with respect to the detected target, whether the detected target is the stationary object or the non-stationary object to set the evaluation value of the background map information regarding a detected position of the detected target, wherein determining whether the detected target is the stationary object based on the relative behavior includes calculating a certainty factor of the detected target being the stationary object based on the relative behavior, based on the certainty factor being equal to or higher than a certainty factor threshold, the database management device is further configured to increase the evaluation value of the background map information regarding the detected position, and based on the certainty factor being lower than the certainty factor threshold, the database management device is further configured to decrease the evaluation value of the background map information regarding the detected position.

* * * * *